No. 804,375. PATENTED NOV. 14, 1905.
H. H. BUFFUM.
STEERING MECHANISM FOR AUTOMOBILES.
APPLICATION FILED MAY 7, 1902.
2 SHEETS—SHEET 1.
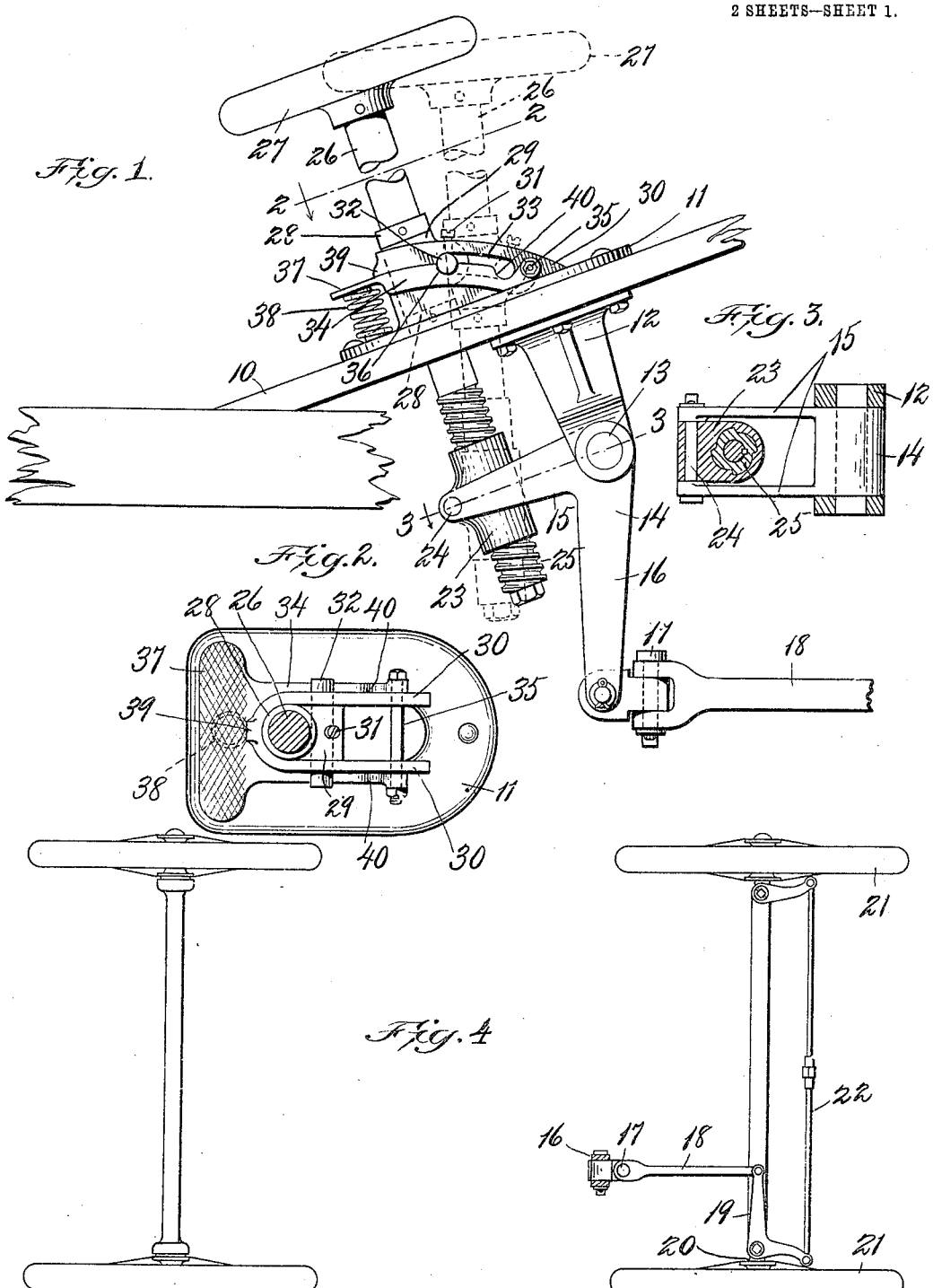

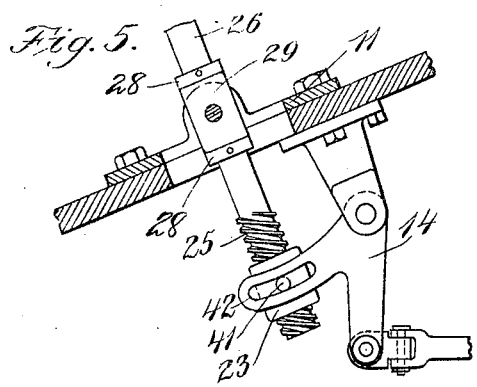
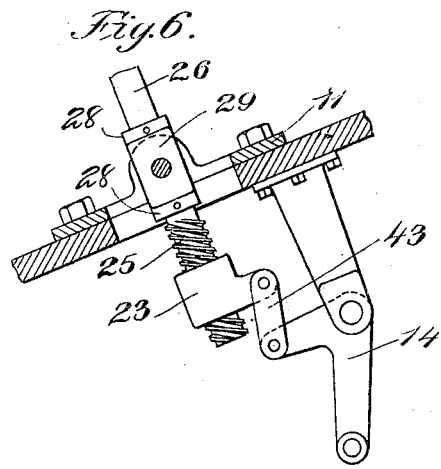
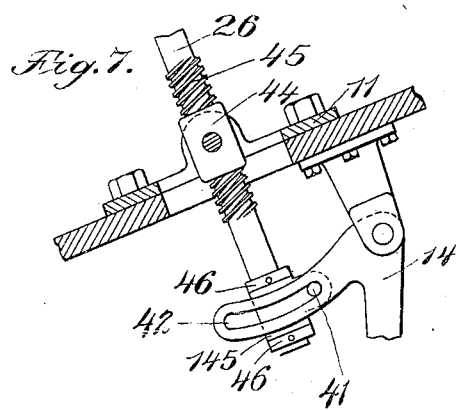
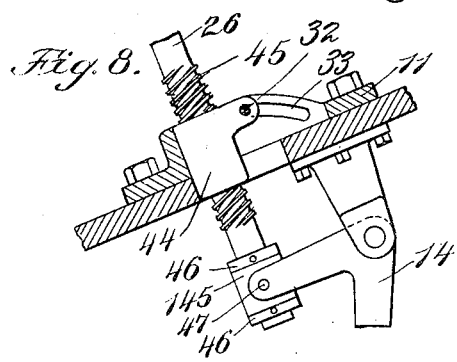

UNITED STATES PATENT OFFICE.

HERBERT H. BUFFUM, OF ABINGTON, MASSACHUSETTS, ASSIGNOR TO ELECTRIC VEHICLE COMPANY, OF JERSEY CITY, NEW JERSEY, AND NEW YORK, N. Y., A CORPORATION OF NEW JERSEY.

STEERING MECHANISM FOR AUTOMOBILES.

No. 804,375.   Specification of Letters Patent.   Patented Nov. 14, 1905.

Application filed May 7, 1902. Serial No. 106,264.

*To all whom it may concern:*

Be it known that I, HERBERT H. BUFFUM, of Abington, in the county of Plymouth and State of Massachusetts, have invented certain new and useful Improvements in Steering Mechanisms for Automobiles, of which the following is a specification.

This invention relates to steering mechanisms of the locked or non-reversing type for automobile-vehicles; and it consists in certain novel features of construction and arrangement which I shall now proceed to describe and claim.

Of the accompanying drawings, Figure 1 represents a side elevation of an automobile-steering mechanism constructed in accordance with my invention. Fig. 2 represents a section on line 2 2 of Fig. 1. Fig. 3 represents a section on line 3 3 of Fig. 1. Fig. 4 represents a plan showing the connection with the steering-wheels. Figs. 5 to 8, inclusive, represent sectional elevations showing four modifications of the invention.

The same reference characters indicate the same parts in all the figures.

Referring first to Figs. 1 to 4, 10 represents the floor of the vehicle-body, on which I secure a bracket 11, shown with a removable lower part 12, having ears supporting the pintle 13 of a rocker 14, consisting of a bent lever having arms 15 16. The lower arm 16 is connected by a universal joint 17 with a rod 18 running forward and pivoted to a bent lever 19, which is attached to the pintle of one of the steering-knuckles 20 of the steering-wheels 21 21. The other arm of the bent lever 19 is connected by a rod 22 with the opposite steering-knuckle. Between the ears of the forked arm 15 of rocker 14 is mounted a nut 23, fulcrumed on a pin 24, passing through the arm of the rocker and having parallel sides embraced by the ears of said arm, whereby the nut is held from rotation. The nut works upon a screw 25, formed on the lower end of a steering-shaft 26, at the upper end of which is shown a hand-wheel 27 for rotating the shaft. On the shaft 26, between fixed collars 28 28, is loosely mounted a bearing-sleeve 29, which works between ears 30 30, formed on the bracket 11, and has secured to it by a set-screw 31 a pin 32, whose ends form studs or trunnions projecting through segmental slots 33 in the ears 30, forming guides for said studs. These slots are curved on a radius from fulcrum-pin 24 when the wheels are in a middle position. 34 is a U-shaped latch pivoted at 35 to the bracket 11 and formed with a notch 36, adapted for locking engagement with the pin 32. The rear end of the latch is provided with an extension or foot plate 37, adapted to be engaged by the operator's foot when it is desired to depress the latch. A spring 38 pressing upwardly on the latch tends to throw the latter into locking engagement with the pin 32, and a projection 39 on the bracket limits the upward movement of said latch. The latch is also formed with cam-inclines 40 adjacent to the forward end of the slots 33, whereby the latch will be automatically depressed when the steering-shaft is swung back from its foremost position toward its normal position. It is evident that the axial thrust received by the shaft 26 is resisted by the pin 32, engaging the walls of the slots 33. Rotation of the shaft causes the nut 23 to work up and down on the screw 25, which is made of steep pitch, so that a small proportionate rotation of the shaft will give a large axial movement to the nut, this movement being communicated to the rocker 14 and from thence to the steering-wheels 21, whereby the latter are turned. The pitch of the screw, however, is below the critical angle, so that the axial thrust of the nut is incapable of rotating the shaft, and consequently the wheels are locked against reversing strains. The full lines in Fig. 1 illustrate the normal position of the steering-shaft, in which it is inclined rearwardly from a vertical position toward the operator's seat, so that the wheel 27 is within easy reach, the shaft being locked in this position by the latch 34. To give increased room for entering and leaving the carriage, the shaft may be released by a depression of the latch 34 and thrown forward into an approximately vertical position, (or farther by a proper proportioning of the parts,) as indicated in dotted lines. The latch 34 may, if desired, be provided with a plurality of notches at different distances from its pivot, so as to lock the shaft in different angular positions. It will be observed that this swinging movement of the shaft is by the arrangement of parts permitted to take place without altering the relative axial position of the bearing 29 and nut 23 on the shaft. The shaft is preferably thrown when the steering-wheels are in middle position.

In Figs. 5 to 8 I have shown a few modifications designed to illustrate the scope of my invention, though without attempting to set forth all variations which might be made.

Fig. 5 shows the bearing 29 pivoted stationarily between ears on the bracket 11, so as to merely rock without sliding in said bracket. The nut 23 in this instance slides between ears on the rocker 14, which hold it from rotation, and is provided with a pin 41, operating in slots 42 in said ears, whereby the swinging movement of the shaft 26 is permitted.

Fig. 6 shows an arrangement similar to the foregoing, but in which the connection between the nut 23 and the rocker 14 is formed by links 43, which transmit the axial movement of the nut to the rocker, but also permit the swinging movement of the shaft.

Fig. 7 shows an arrangement where a nut 44 is pivoted similarly to the bearing 29 in Figs. 5 and 6 and engages a screw 45, formed on the shaft 26. A loose bearing or collar 145 is held between collars 46 46 on the lower end of the shaft and has a connection with the rocker 14 similar to the connection between the nut and rocker shown in Fig. 5.

Fig. 8 shows another modification, in which a nut 44, operating on a screw-thread 45 on the shaft, has a sliding and end-thrust-resisting connection with the bracket 11, similar to the connection of the collar 29 shown in Fig. 1, while a bearing 145 on the lower end of the shaft has a fulcrum connection at 47 with the rocker 14. In Figs. 7 and 8, since the nut is held stationary, the shaft is caused by its rotation to move axially and impart a rocking movement to the rocker 14.

I claim—

1. In a steering mechanism for motor-vehicles, the combination of a rotatable steering-shaft having a screw, a rocker connected with a steering-wheel of the vehicle, a nut on said screw fulcrumed on said rocker, a bearing-guide, and a bearing for the shaft secured against axial thrust thereon and having an axial thrust-resisting laterally-sliding connection with said guide.

2. In a steering mechanism for motor-vehicles, the combination of a rotatable steering-shaft having a screw, a rocker connected with a steering-wheel of the vehicle, a nut on said screw fulcrumed on said rocker, a bearing-guide formed with a segmental slot curved on a radius from the nut-fulcrum, and a bearing for the shaft secured against axial thrust thereon and having a stud occupying said slot.

3. In a steering mechanism for motor-vehicles, the combination of a rotatable steering-shaft having a screw, a rocker connected with a steering-wheel of the vehicle, a nut on said screw fulcrumed on said rocker, a bearing-guide formed with a segmental slot curved on a radius from the nut-fulcrum, a bearing for the shaft secured against axial thrust thereon and having a stud occupying said slot, a pivoted latch having a notch to engage and lock said stud, and a spring projecting said latch into locking position.

4. In a steering mechanism for vehicles, a shaft, a threaded lower end, and interengaging traverse-block, the latter supported upon an oscillating lever, a thrust-bearing for said shaft adapted for slight oscillations.

5. A steering-gear for automobiles comprising a hand-wheel, a rotating steering-shaft with a central oscillating thrust-bearing, a lower threaded portion, oscillating connections with a bell-crank lever, and a bell-crank lever.

6. In a steering mechanism for vehicles, a rotary operator's shaft mounted for swinging movement independent of its rotary steering movement, and also mounted for a slight oscillatory movement, a device geared to said shaft and partaking of said swinging movement, and steering connections associated with said device and having provisions for permitting said swinging movement.

7. In a steering mechanism for vehicles, a rotary operator's shaft mounted for swinging movement independent of its rotary steering movement, a device geared to said shaft and partaking of said swinging movement, and also mounted for a slight oscillatory movement, and steering connections associated with said device having provisions for permitting said swinging movement, and means for locking the shaft against said swinging movement.

8. In a steering-gear for automobiles, a rotary shaft, a flat-sided sleeve, said shaft and sleeve adapted to swing to and fro, and also mounted for a slight oscillatory movement, a guide on the footboard and means in said swinging parts to engage said guide and hold said swinging parts in a predetermined position, devices geared to said shaft below said guide, and steering connections associated with said device adapted to permit said swinging movement.

9. In a steering mechanism for automobiles, a shaft, devices operated thereby to deflect a road-wheel, a base-plate above said devices to support said shaft transversely and permit fore-and-aft swinging thereof, and also a slight oscillation thereof, a flat-sided sleeve on said shaft, and means interengaging said sleeve and base-plate to lock the swinging parts in predetermined position.

10. In a steering mechanism for vehicles, a rotary operator's shaft mounted for a slight oscillatory movement, a device geared to said shaft and partaking of said oscillatory movement, and steering connections associated with said device, and having provisions for permitting said oscillatory movement.

11. In a steering mechanism for automobiles, a rotating steering-pillar adapted for slight oscillation, a threaded portion on said pillar, an interengaging threaded member pivotally supported in a bifurcated lever, said lever connected by oscillating or reciprocating parts to deflect the road-wheels to steer the vehicle.

12. In a steering mechanism for automobiles, a rotating steering-pillar adapted for slight oscillation, a threaded portion on said pillar, an interengaging threaded member pivotally supported in one arm of a bell-crank lever, said lever connected by oscillating or reciprocating parts to deflect the road-wheels to steer the vehicle.

13. In a steering mechanism for vehicles, a rotating steering-shaft, a hand wheel or lever normally in proximity to the occupant's seat and at the upper end of said shaft, a threaded portion at the lower end of said shaft engaging a pivoted traverse-block, the latter supported in a bifurcated oscillating member of the lower steering connection, a bearing for said pillar adjustable away from and to the occupant, and also permitting a slight oscillatory movement of said pillar.

14. In a steering mechanism for vehicles, a rotating steering-shaft, a hand wheel or lever normally in proximity to the occupant's seat and at the upper end of said shaft, a threaded portion at the lower end of said shaft engaging a pivoted traverse-block, the latter supported in an oscillating member of the lower steering connection, a bearing for said pillar adjustable away from and to the occupant about the pivots of the threaded block as a center, and permitting a slight oscillation of said pillar.

15. A hinged steering-pillar for automobiles, comprising a rotating steering-shaft, a traverse member pivotally supported upon the arm of a bell-crank lever or corresponding oscillating member of the steering connections, bearings for said steering-shaft permitting hinging and also slight oscillation thereof for the purposes described.

16. In a steering mechanism, a shaft, a threaded portion on said shaft, a member with interengaging threaded portions and adapted for slight oscillation, a bell-crank lever, a bearing to receive the thrust longitudinal of said shaft adapted for slight oscillation.

17. In a steering-gear for automobiles, a rotating steering-shaft, connections to deflect a road-wheel, an oscillating thrust-bearing on said shaft, an operating hand-wheel on the upper end of said shaft and threaded or toothed interengaging parts to effect the oscillation of the steering connections upon the rotation of the shaft.

18. In a steering-gear for automobiles, a rotating steering-shaft, a threaded portion thereon, an engaging threaded portion supported to oscillate on the body or framework of the vehicle, thrust-resisting means coöperating therewith permitting a non-rotative movement of the steering-pillar, an oscillating member depending below the body or frame of the vehicle and connections to steering-wheels relatively movable with respect to the body.

19. In an automobile, steering connections, a back-lock transmission mechanism, an oscillating thrust-bearing, all combined substantially as and for the purpose described.

20. In a steering mechanism for automobiles, a shaft, a threaded portion of said shaft, a base attached to the vehicle body or frame, a thrust-bearing pivoted on said base, an oscillating lever and connections to deflect a road-wheel, interengaging means between said lever and shaft including a segmental slot and pin.

21. In a steering-gear for vehicles, a rotating shaft, a threaded member or portion on said shaft, an interengaging threaded member supported on and adapted to move in an arc with a pivotally-oscillating part of the steering connections, a bearing for said oscillating part, a separate bearing for supporting said shaft in an operating position, said bearings rigidly interconnected.

22. In a steering mechanism for vehicles, a rotatable steering-shaft, a hand-wheel to rotate the same convenient to the operator, a bell-crank one arm of which is connected with the links or arms to deflect the road-wheels and the other arm thereof flexibly supporting a threaded or toothed member, a threaded or toothed portion operatively connected to the steering-shaft and coöperating with the former threaded or toothed member, a flexible thrust-bearing on said steering-shaft between the threaded or toothed portion and the operating-wheel.

23. In a steering mechanism for vehicles, a rotating steering-shaft, a hand wheel or lever normally in proximity to the occupant's seat and at the upper ends of said shaft, a threaded portion at the lower end of said shaft engaging a pivoted transverse block, the latter supported in an oscillating member of the lower steering connection, a bearing for said pillar freely adjustable away from and to the occupant.

24. A steering mechanism for a vehicle comprising a steering hand-wheel, a rotating steering-shaft, a trunnioned thrust-bearing on said shaft between its ends, a threaded member or portion on the lower end of the shaft, and interengaging threaded portion mounted in a lever-arm, pivotal connections whereby the interengaging threaded part of the steering-shaft will move with the oscillating lever-arm and the main shaft portion retains a securely-operative position in its thrust-bearings.

25. In a steering-gear for vehicles, a bell-crank lever, one arm thereof connected with the road-wheel-deflecting members, the other arm carrying a threaded portion, and interengaging threaded member, a rotating steering-shaft, a bearing for said shaft, substantially rigid connections between said bearing and the bearing of said bell-crank lever, said interengaging threaded member operatively connected with the rotating steering-shaft and pivotal connections whereby said interengaging threaded members oscillate with the bell-crank arm about its center.

26. In an automobile, controlling connections including a rotating shaft and means to rotate said shaft near one end, threaded connections with a member of the rock-shaft at the other end, intermediate flexible thrust-bearings substantially as described.

27. In an automobile, controlling connections including a rotating shaft and means to rotate said shaft near one end, threaded connections with a member of the rock-shaft at the other end, the interengaging threaded member being supported on and moving with the rock-shaft, a flexible thrust-bearing for said shaft and substantially rigid connection between said thrust-bearing and the bearing for the rock-shaft, substantially as described.

In testimony whereof I have affixed my signature in presence of two witnesses.

HERBERT H. BUFFUM.

Witnesses:
R. M. PIERSON,
P. W. PEZZETTI.